W. PADERNACHT.

SKIRT.

APPLICATION FILED JUNE 8, 1910.

Reissued May 9, 1911.

13,238.

2 SHEETS—SHEET 1.

Attest:

C. Mitchell,

Aaron Ginsburg.

Inventor:

William Padernacht by Thos. H. Dowesmc

Atty

THE NORRIS PETERS CO., WASHINGTON, D. C.

W. PADERNACHT.

SKIRT.

APPLICATION FILED JUNE 8, 1910.

Reissued May 9, 1911.

13,238.

2 SHEETS—SHEET 2.

Attest:

C. D. Mitchell

Aaron Ginsburg

Inventor:

by William Padernacht

Fred H. Bowersock Atty

THE NORRIS PETERS CO., WASHINGTON, D. C.

UNITED STATES PATENT OFFICE.

WILLIAM PADERNACHT, OF NEW YORK, N. Y., ASSIGNOR TO ANNA PADERNACHT, OF NEW YORK, N. Y.

SKIRT.

13,238. Specification of Reissued Letters Patent. Reissued May 9, 1911.

Original No. 929,163, dated July 27, 1909, Serial No. 474,758. Application for reissue filed June 8, 1910. Serial No. 565,892.

*To all whom it may concern:*

Be it known that I, WILLIAM PADERNACHT, a citizen of the United States, residing at New York, in the county of New York and State of New York, have invented certain new and useful Improvements in Skirts, of which the following is a specification.

This invention relates to improvements in skirts, and has particular reference to that type of skirt disclosed in my Patent No. 853,993, dated May 21, 1907, wherein a back-piece is employed in connection with adjoining portions adapted to be folded and laid upon the back-piece and secured at the waist band thereto.

It will be noted that in my previous structure, the adjustment of the skirt is effected simultaneously with the fastening of the folds to the back-piece after the skirt has been placed upon the person.

The principal objects of the present invention are to provide a skirt having a wider range of adjustment, and which may be readily and easily adjusted as to the length of the waistband prior to the application of the skirt to the user; which has but the one usual placket opening; in which the ends of the waistband, irrespective of the adjusted length thereof, may be secured together in the usual manner; in which the single placket opening may be closed and secured in the usual manner, and in which the folds of the material, resulting from the adjustment of the length of the waistband, form symmetrical plaits so disposed and arranged as to give the skirt when worn the neat and finished appearance of the ordinary well-fitting, non-adjustable skirt.

Figure 1:
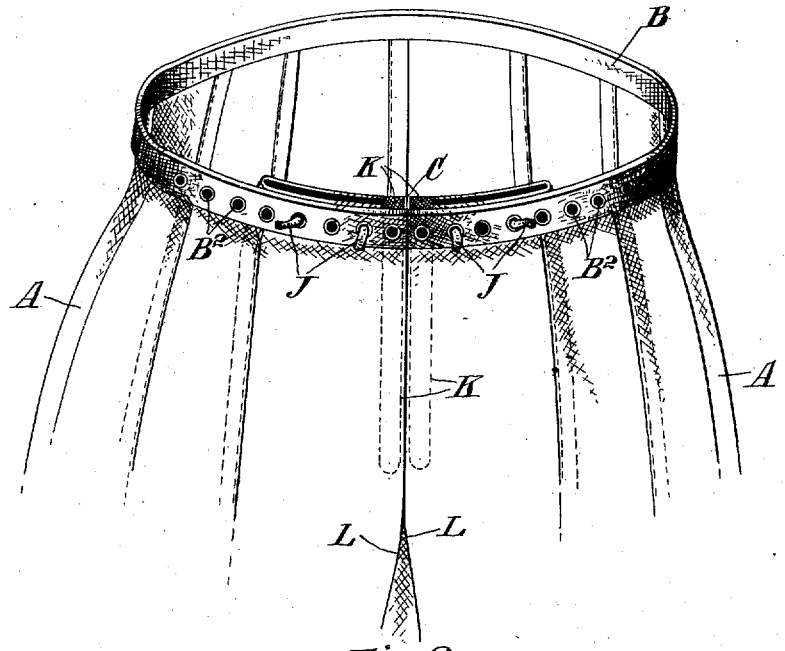
Figure 2:
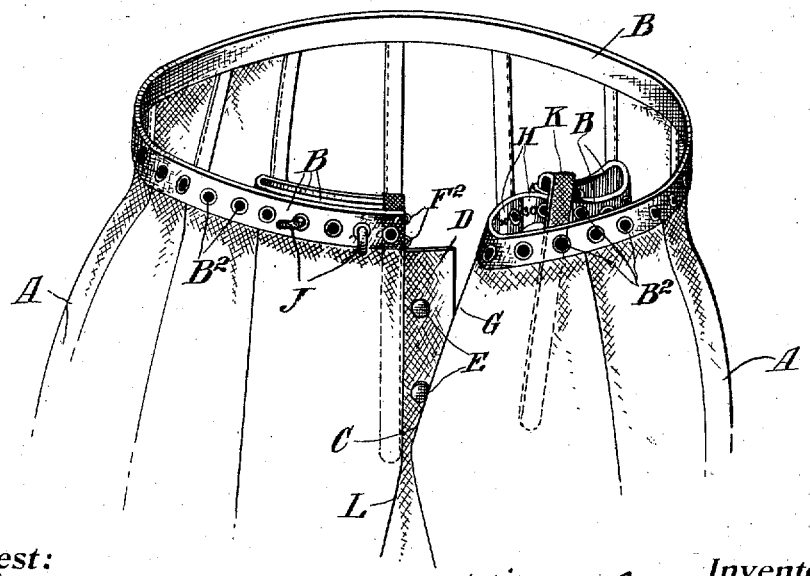
Figure 3:
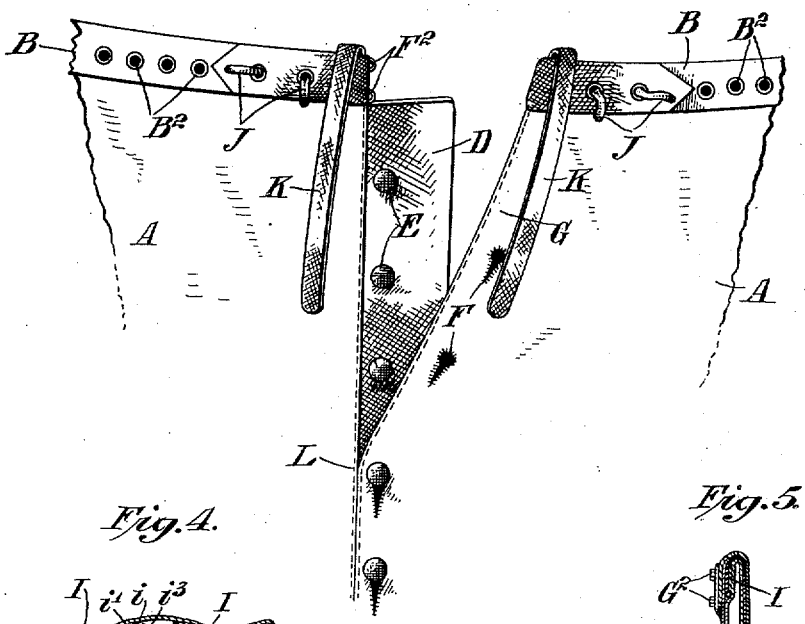
Figure 4:
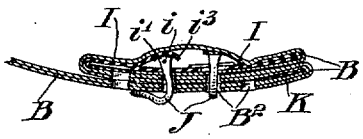
Figure 5:
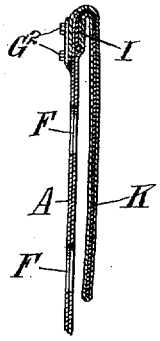
Figure 6:
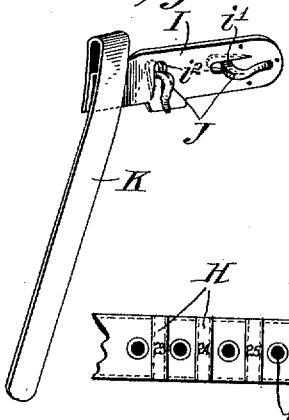
Figure 7:
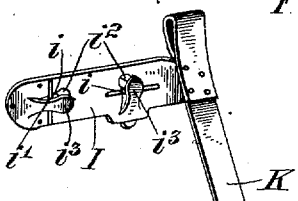
Figure 8:
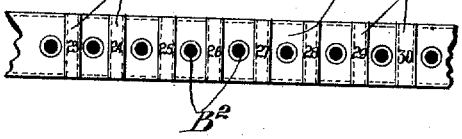

Figure 1 is a back view of a skirt constituting one embodiment of the invention; Fig. 2 is a similar view showing the opposite adjustable members of the skirt in partially open condition; Fig. 3 is a similar view with the back of the skirt fully opened; Fig. 4 is a section through one end of the adjusted waist-band of Fig. 1; Fig. 5 is a longitudinal section through one of the adjoining portions of the skirt; Figs. 6 and 7 are perspective detail views of reinforcing stays which may be employed in connection with my invention; and Fig. 8 is an inside view of one end of the eyeleted waistband.

Referring now to the drawings in detail, the letter A designates the body of the skirt, which is provided with the waist-band B and the placket opening C. At this placket opening, the body of the skirt has a flap D, which is provided with means for securing the same to the opposite edge of the skirt at said opening, such as the buttons E adapted to be engaged by complementary button-holes F on the overlying portion or edge G. The ends of the waist-band may be secured together in any desired manner, but I prefer to employ a pair of eyelets $F^2$ suitably secured to one end of said waist-band and adapted to be engaged by hooks $G^2$ at the other end thereof to secure the skirt to the body of the wearer in the usual manner.

To render the skirt adjustable as to the size or length of the waist-band, I fold the portions of the skirt and waist-band adjacent to the placket opening in a manner which will be hereinafter described, and provide means for securing the folds in such manner that while firmly secured the same may be easily and readily readjusted when desired. It will be apparent that any one of a number of different and well-known forms of temporary fastening means may be employed for this purpose, but for convenience and to facilitate quick and easy readjustment of the folds or plaits, I prefer to provide the waist-band with a series of eyelets $B^2$ extending some distance from each end of the waist-band B. Coöperating with these eyelets, I have shown a pair of hooks J at each end of the waist-band, the hook nearest the end of the waist-band being preferably vertically disposed and the other hook, in each case, being preferably horizontally disposed, as shown, for a purpose which will be hereinafter made clear. These hooks may be secured to or near the ends of the waist-band in any desired manner, although I prefer to employ a small metal plate I which is secured at each end of the waist-band and which not only provides a suitable support for the hooks, if hooks are employed, but reinforces and stiffens the end portions of the waist-band. When a plate of this character is employed, I prefer that the hooks be pivoted to the spring clips $i^3$, struck out from the plate, and provide said hooks with shanks $i^1$ extending over the openings $i^2$ in the plate which are formed when the springs $i^3$ are struck out from said plate. As will be apparent, these springs will have the effect of yieldingly holding the hooks J in a closed condition.

When it is desired to adjust the skirt and waist-band to any given size, each edge of the skirt adjacent to the packet opening is folded outwardly upon itself, as shown in Fig. 2, in such manner that the end edge of the skirt at the placket opening and the edge of the folded overlying portion register with each other, as shown in Figs. 1, 2 and 4. The eyelets are so spaced and arranged that when so folded, for any "regular" size, the eyelets in the superposed layers of the material will register with each other, and the hooks J, therefore, may be passed through the corresponding and registering eyelets in these portions of the waist-band which are folded thereover, thus firmly securing the fold or plait at the edge of the body portion of the skirt at the placket opening. It will be noted that this arrangement of the folded layers brings all of the folds, except the outer, on the inside of the skirt, said outer folds being at the ends of the waist-band whereby when the ends of said waist-band are secured together, said folds have the appearance of plaits L, with edges abutting, so that when the placket is closed and the ends of the waist-band secured together, as explained, the skirt will have the neat and finished appearance shown in Fig. 1. I may further insure proper "hang" and adjustment of the plaits L by securing to the plate I, if this plate is employed, a stay K projecting upwardly from the end of said plate and out of the upper edge of the waist-band, where it is bent downwardly over the front of the same and over the body of the skirt for a substantial distance, as shown in Fig. 3. This stay is preferably covered with a protecting or facing material of the same color as the material of which the body of the skirt is formed. It may be noted that the relative positions of the two stays at the opposite edges of the skirt are such that the stay at the button-holed edge overlies the extreme outer edge of the body portion, while the stay adjoining the button-carrying flap D overlies the inner edge of said flap. Each of these stays is designed to be interposed between the layers of the folded portion of the skirt at the folded edge thereof. It will be observed that the stays K, being arranged as described occupy a position inside the edge of the folds just referred to and stiffen the same, whereby when brought into juxtaposition they serve effectually to prevent undue separation of the folds, thereby further insuring a constant closure along the back or placket portion of the skirt. With respect to these so-called stays "K", it will be noted that when a stay is suitably secured at each end of the waistband, it insures bringing the edges of the plaits L together to entirely conceal the placket when the ends of the waistband are fastened, as is clearly shown in Fig. 1. In other words, no adjustment of these plaits L is necessary after the skirt has been put on and the waistband fastened, the operation of fastening the ends of the waist-band automatically effecting, through these stays K, the proper adjustment and "hang" of the plaits or outer folds.

To facilitate adjustment of the skirt to any given size prior to the application of the skirt to the wearer, I may provide between each of the eyelets $B^2$ a series of indicators H, showing the points to which the band is to be folded to make the same of a certain given size. These indicators may be applied to the band in any desired manner, as, for instance, by attaching small pieces of tape or the like, of a color differing from the color of the skirt and bearing marks indicating the various sizes to which the skirt may be adjusted, in the present case, as shown, in Fig. 8, from size 23 inches to size 31.

Having thus described a practical and convenient embodiment of my invention, I claim as new and desire to secure by Letters Patent:

1. A skirt comprising a body portion and a waistband with a placket opening, means for detachably closing said placket and connecting the ends of said waistband, means for adjustably securing each of the opposite portions of the skirt adjoining the placket in a folded condition with the inner folds concealed and the outer folds meeting to cover said closing and connecting means, and supplemental means adjustable on said folded portions to hold the meeting edges thereof in contact with each other.

2. A skirt comprising a body portion and a waistband with a placket opening, means for detachably closing said placket and connecting the ends of said waistband, and means for detachably securing each of the opposite portions of the skirt adjoining the placket in a folded condition, said means insuring the meeting of the outer folds to cover said placket when the ends of said waistband are connected and including concealed fasteners at the meeting edges of the folds.

3. A skirt comprising a body portion and a waist-band with a single placket opening, means for detachably connecting the ends of the said waist-band, series of eyelets in said waist-band, means coöperating with said eyelets for adjustably securing each of the opposite portions of the skirt adjoining said placket in a folded condition with the inner folds concealed and the edges of the outer folds meeting to cover said placket, and supplemental fasteners adjustably mounted at the meeting edges of the folds.

4. A skirt comprising a body portion and a waist-band with a single placket opening, means for detachably connecting the ends of said waist-band, series of eyelets in said waist-band, and means secured to said waist-band and coöperating with said eyelets for adjustably securing each of the opposite portions of the skirt adjoining said placket in a folded condition with the inner folds concealed and the edges of the outer folds meeting to cover said placket, said last-mentioned means including adjustable fasteners for securing together the meeting edges of said folds.

5. A skirt comprising a body portion and a waist-band with a single placket opening, means for detachably connecting the ends of said waist-band at said placket, and means for adjustably securing each of the opposite portions of the skirt adjoining the placket opening in a folded condition with the inner folds concealed and the edges of the outer folds meeting to cover said placket, said last-mentioned means comprising eyelets in said waist-band, hooks for engaging registering eyelets in the folded material and adjustable fasteners for securing together the meeting edges of said folds.

6. A skirt provided with a body portion having a placket opening and means for securing the opposite portions of the skirt adjoining the placket opening in adjustably folded condition, said means including supplemental fasteners adjustably mounted within the folds to secure together the meeting edges thereof.

7. A skirt provided with a body portion having a placket opening and means for securing the opposite portions of the skirt adjoining the placket opening in adjustably folded condition, said means including devices for reinforcing the edges of the outer folds.

8. A skirt provided with a body portion having a placket opening and means for securing the opposite portions of the skirt adjoining the placket opening in adjustably folded condition, said means including a stay carried by the skirt and being arranged to removably engage one of the folds of said adjustable portion.

9. In a device of the character described, a stay formed at its upper end with a return bend offset to leave a space therewithin, and means for securing the device in place so that the major portion of the stay will be free.

10. In a skirt, means for adjusting the opposite portions thereof adjoining the placket opening comprising devices carried at the upper edge of the skirt adapted to secure the same in folds, and like indicators on the opposite portions of the skirt at points adjoining the securing means to facilitate equal adjustment of the two sides of the skirt.

11. A skirt comprising a body portion and a waist-band with a single placket opening, means for detachably connecting the ends of said waist-band at said placket, means for adjustably securing each of the opposite portions of the skirt adjoining the placket opening in a folded condition with the inner folds concealed and the edges of the outer folds meeting to cover said placket, and like indicating means on the opposite portions of the waist-band to facilitate adjustment on the opposite sides of the skirt.

12. In a skirt, a body portion provided with a placket opening, means for closing said placket comprising a flap carrying a series of buttons coöperating with button holes on the opposite edge of the skirt which overlies said flap, means for securing the ends of the waistband together and means for adjustably securing each of the opposite portions of the skirt adjoining the placket in a folded condition with the inner folds concealed and the outer folds meeting to cover said placket, said last-mentioned means including adjustable fasteners for securing together the meeting edges of said folds.

In testimony of the foregoing, I have hereunto set my hand in the presence of two witnesses.

WILLIAM PADERNACHT.

Witnesses:
SAMUL JARETSKI,
SAMUL GITTLEMAN.

Copies of this patent may be obtained for five cents each, by addressing the "Commissioner of Patents, Washington, D. C."